M. V. NICHOLS.
Vehicles.
No. 6,000. Reissued Aug. 4, 1874.
Fig. 4.
Fig. 1.
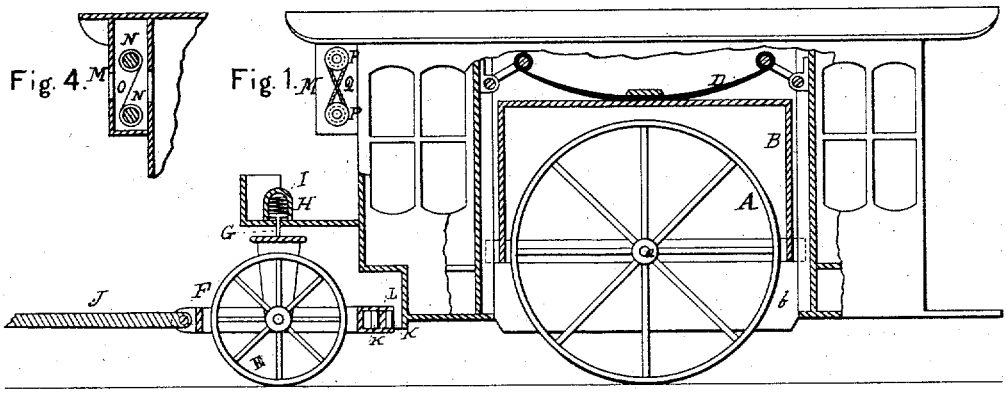
Fig. 2.
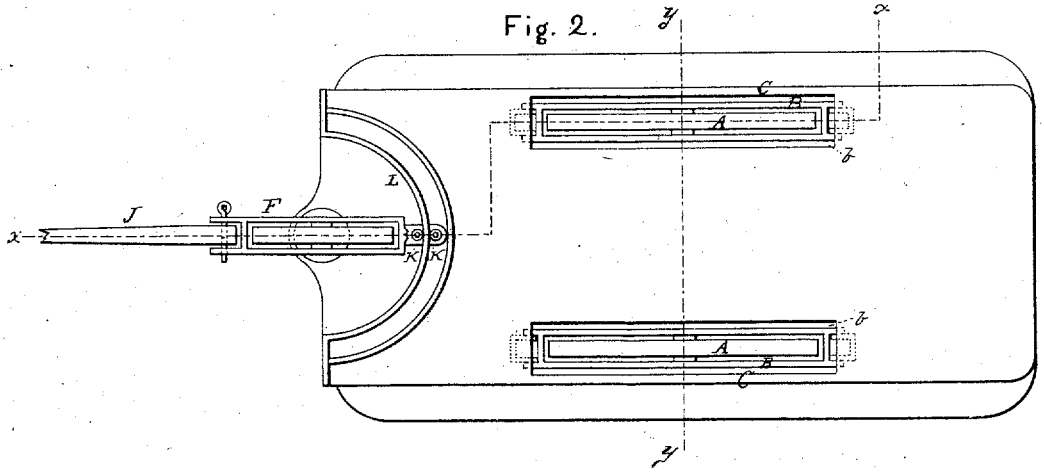
Fig. 3.
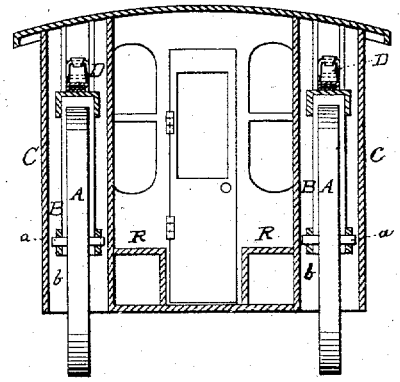
WITNESSES
Villette Anderson
George E. Upham.
INVENTOR
Martin V. Nichols
By Chipman & Fosmer & Co.
ATTORNEYS.
THE GRAPHIC CO. PHOTO-LITH. 39 & 41 PARK PLACE, N.Y.

UNITED STATES PATENT OFFICE.

MARTIN V. NICHOLS, OF OSAGE, IOWA.

IMPROVEMENT IN VEHICLES.

Specification forming part of Letters Patent No. 144,743, dated November 11, 1873; reissue No 6,000, dated August 4, 1874; application filed March 7, 1874.

*To all whom it may concern:*

Be it known that I, MARTIN V. NICHOLS, of Osage, in the county of Mitchell and State of Iowa, have invented a new and useful Improvement in Street-Car or Omnibuses, of which the following is a specification:

Figure 1 of the drawings is a side view of my improved omnibus, partly in section, through the line *x x*, Fig. 2. Fig. 2 is a view of the under side of the same. Fig. 3 is a vertical cross-section of the same taken through the line *y y*, Fig. 2. Fig. 4 is a section of the street-indicator.

This invention has relation to means for lessening the racking effect of the load upon the wheel-bearings of a road-carriage, and at the same time moderating and equalizing the effect of inequalities of the road; and it consists in suspending the carriage-body by its upper portion on and between vertically-reciprocating independent bearing frames or props, which extend from the wheel-journals to points above the perimeters of the wheels, which are designed to be of large diameter.

In the accompanying drawings, the letter A indicates the wheels, which are made of large diameter, in order to bridge inequalities in the road-bearing, and thereby moderate and equalize the effect thereof, while lessening the lateral racking action on account of the longer leverage of said wheels.

Each wheel is provided with a short journal or shaft, *a*, which is connected by its ends with a frame, B, which extends upward beyond the perimeter of the wheel. Each frame is independent of the other, and is designed to have free vertical movement in a slide-way, *b*, formed between the side wall of the body of the vehicle, and an exterior bearing, C, attached rigidly to said wall. Above the upper part of each frame is arranged a spring, D, upon which the carriage-body bears at its upper portion, and which in turn bears on said frame, suitable bearing devices being provided. In this manner the main portion of the body of the vehicle is suspended between the wheel-frames, and bears upon said frames through the medium of springs D.

The exterior wall or guard C of the slide-way may be made in such a manner as to incase the frames and the greater portions of the wheels. This exterior wall or bearing serves not only to keep the wheel-frames in place, but also to strengthen that portion of the body which bears directly on the wheel-frames.

As the transverse connection between the wheels is made by the body alone of the vehicle, no axle being employed, it is apparent that the body should, with due regard to lightness, be strengthened with this object in view.

Thus arranged, the main weight of the body is designed to be suspended between side wheels. The end of the carriage may be supported by a caster-wheel, or two wheels placed near together, the journal thereof being connected with a frame, F, provided with a spindle, G, which enters a socket, H, attached to the front of the body of the vehicle, and in which is placed a coiled spring, I, against which the spindle bears. To the forward end of the frame F the tongue J is connected, and to its rear end may be pivoted the guide-rollers K, between which passes the semicircular guide-rod L, the ends of which are attached to the forward end of the carriage-body.

The wheel E, frame F, and guide-rod L may be placed in a recess beneath the front portion of the carriage-body.

In the upper forward part of the carriage-body is placed a box, M, in which are pivoted two rollers, N, to which is attached and around which is wound a strip, O, of cloth or other suitable material, upon which are printed the names of the streets to be crossed by the car in making its trip. To the ends of the rollers N are attached pulleys P, around which passes a belt, Q, so that the rollers may be turned together, and the driver can readily adjust the strip O, and thus enable the passengers to know what street will be crossed next. R designates the seats, which may extend along the sides of the body.

In this manner I have designed to provide for the use of wheels of the largest diameter, at the same time bringing the body of the vehicle near the ground, so that the load will be suspended between the wheel-bearings. At the same time the weight is brought between the lower edges or tread of the wheels and the bearings near the top of the body. The effect of the leverage of the weight in intensifying the racking action of inequalities of the road-bearing is, in great measure, obviated by this arrangement. The motion of each wheel being communicated through the long wheel-bearing to the top of the body, and through the body-wall to the bottom thereof, on which the load rests, is moderated, and exerts a counteracting effect on the motion of the other. The body, also, being carried low, is easily accessible and safe.

I do not desire to confine myself to the method of construction herein described, as this may be varied in many ways well known to those skilled in the art without forsaking the principle embodied.

What I claim as new, and desire to secure by Letters Patent, is—

1. In a road-wagon, separate frames for single wheels carrying the wheel-journals, and extending upward therefrom to bearings at or near the top of the vehicle, all combined substantially as specified.

2. The combination, with a vehicle-body having the exterior side-bearing C parallel with the side-wall of the body, of wheels and vertically-reciprocating wheel-frames, to which said wheels are journaled, substantially as specified.

3. Wheels A A, on journals within frames bearing against superposed springs over said wheels, all combined as and for the purpose described.

4. The wheel or wheels E, frame F, spindle G, socket H, spring I, rollers K, and semicircular guide-rod L, all combined and applied to a vehicle-body, substantially as specified.

5. The wheels A of the independent movable wheel-frames carrying the journals of said wheels, and the vehicle-body suspended between and supported on said wheel-frames by bearings at or near its top, all combined, substantially as specified.

6. A vehicle having its body suspended on independently-movable wheel-frames between side-wheels A, and supported at the end by an auxiliary wheel, all combined substantially as specified.

In testimony that I claim the above I have hereunto subscribed my name in the presence of two witnesses.

MARTIN V. NICHOLS.

Witnesses:
GEORGE E. UPHAM,
PHIL. C. MASI.